United States Patent
Jayakody et al.

(10) Patent No.: US 10,377,871 B1
(45) Date of Patent: Aug. 13, 2019

(54) FLAME-RETARDANT COMPOSITION AND PROCESS FOR A FLEXIBLE OPEN-CELL POLYURETHANE FOAM

(71) Applicant: Chestnut Ridge Foam, Inc., Latrobe, PA (US)

(72) Inventors: Chandrasiri Jayakody, Saginaw, MI (US); Carl Melvin Ogburn, Export, PA (US); Mark Allen Brown, Greensburg, PA (US)

( * ) Notice: Subject to any disclaimer, the term of this patent is extended or adjusted under 35 U.S.C. 154(b) by 0 days.

(21) Appl. No.: 14/996,695

(22) Filed: Jan. 15, 2016

Related U.S. Application Data

(60) Division of application No. 13/780,491, filed on Feb. 28, 2013, now abandoned, which is a continuation-in-part of application No. 12/556,556, filed on Sep. 9, 2009, now abandoned.

(60) Provisional application No. 61/095,602, filed on Sep. 9, 2008.

(51) Int. Cl.
| | |
|---|---|
| *C08J 9/00* | (2006.01) |
| *C08J 9/36* | (2006.01) |
| *C09K 21/12* | (2006.01) |
| *C08G 18/76* | (2006.01) |
| *C08G 18/48* | (2006.01) |
| *C08G 101/00* | (2006.01) |

(52) U.S. Cl.
CPC ........ *C08J 9/0038* (2013.01); *C08G 18/4829* (2013.01); *C08G 18/7621* (2013.01); *C08J 9/0066* (2013.01); *C08J 9/0095* (2013.01); *C08J 9/36* (2013.01); *C09K 21/12* (2013.01); C08G 2101/0008 (2013.01); C08G 2101/0058 (2013.01); C08J 2205/06 (2013.01); C08J 2207/00 (2013.01); C08J 2475/08 (2013.01)

(58) Field of Classification Search
CPC ............... C08L 75/04; C08G 2101/00; C08G 2101/0008; C08G 2101/0058; C08G 2101/0083; C08G 2150/60; C08G 18/48; C08G 18/4829; C08G 18/4833; C08G 18/4837; C08G 18/7621; C09K 21/12; C08J 9/0019; C08J 9/0023; C08J 9/0028; C08J 9/0038; C08J 9/0066; C08J 9/0095; C08J 9/36; C08J 2375/04; C08J 2205/06; C08J 2207/00; C08J 2475/08
See application file for complete search history.

(56) References Cited

U.S. PATENT DOCUMENTS

| 5,134,172 | A | * | 7/1992 | Bruyninckx | ....... | C08G 18/4018 521/125 |
| 5,739,173 | A | * | 4/1998 | Lutter | ................ | C08G 18/3851 521/100 |
| 5,945,467 | A | * | 8/1999 | Iwata | ....................... | C08K 3/22 428/403 |
| 5,981,612 | A | * | 11/1999 | Keppeler | ........... | C08G 18/3878 521/106 |
| 2007/0021516 | A1 | * | 1/2007 | Hansel | ................... | C08K 5/521 521/99 |

* cited by examiner

*Primary Examiner* — John M Cooney
(74) *Attorney, Agent, or Firm* — Tucker Arensberg, P.C.

(57) ABSTRACT

A flame retardant composition for producing a resulting polyurethane foam, a flame retardant process for producing a resulting polyurethane foam, and a resulting polyurethane foam produced by a flame retardant process are described. The resulting polyurethane foam meets the Federal Railroad Administration, National Fire Protection Association, and Federal Transit Administration fire performance testing criteria for cushioning applications in railway, bus, and van industries.

17 Claims, No Drawings

# US 10,377,871 B1

FLAME-RETARDANT COMPOSITION AND PROCESS FOR A FLEXIBLE OPEN-CELL POLYURETHANE FOAM

CROSS-REFERENCE TO RELATED APPLICATIONS

This application is a divisional of U.S. Non-Provisional Patent Application, entitled "FLAME RETARDANT COMPOSITION AND PROCESS FOR A FLEXIBLE OPEN-CELL POLYURETHANE FOAM," having Ser. No. 13/780,491, filed on Feb. 28, 2013, which itself is a continuation-in-part of U.S. Non-Provisional Patent Application, entitled "FLAME-RETARDANT COMPOSITION AND PROCESS FOR A POLYURETHANE FOAM" having Ser. No. 12/556,556, filed Sep. 9, 2009 which claims the benefit of an earlier-filed U.S. Provisional Patent Application, entitled "FLAME-RETARDANT COMPOSITION AND PROCESS FOR A POLYURETHANE FOAM" having Ser. No. 61/095,602, filed Sep. 9, 2008, all of said U.S. Non-Provisional Patent Applications and said U.S. Provisional Patent Application hereby fully incorporated by reference.

DETAILED DESCRIPTION

1. Definitions

The following terms are generally defined as follows for the purpose of this disclosure:

"ASTM" means the American Society for Testing and Materials. As used herein, ASTM refers to standards relating to polyurethane foam. The ASTM standards as referenced herein and are incorporated by reference herein.

"ASTM D 3574" means the Standard Test Methods for Flexible Cellular Materials—Slab, Bonded, and Molded Urethane Foams. ASTM D 3574 is incorporated by reference herein.

"ASTM D 3675" means the Standard Test Method for Surface Flammability of Flexible Cellular Materials Using a Radiant Heat Energy Source. ASTM D 3675 is incorporated by reference herein. Testing under ASTM D 3675 is generally referred to as flame spread testing.

"ASTM E 662" means the Standard Test Method for Specific Optical Density of Smoke Generated by Solid Materials. ASTM E 662 is incorporated by reference herein. Testing under ASTM E 662 is generally referred to as smoke density testing and generally occurs with flaming mode (i.e., when material is ignited) and non-flaming mode (i.e., when material is smoldering).

"ASTM E 1354" means the Standard Test Method for Heat and Visible Smoke Release Rates for Materials and Products Using an Oxygen Consumption calorimeter. ASTM E 1354 is incorporated by reference herein.

"ASTM E 1474" means the Standard Test Method for Determining the Heat Release Rate of Upholstered Furniture and Mattress Components or Composites Using a Bench Scale Oxygen Consumption calorimeter. ASTM E 1474 is incorporated by reference herein.

"NFPA 130" means the NFPA 130 Standard for Fixed Guideway Transit and Passenger Rail Systems. NFPA 130 is incorporated by reference herein.

"Federal Standard 191A, Method 5830" means Federal Standard 191A, Method 5830 which is entitled "Leaching Resistance of Cloth; Standard Method" (Jul. 20, 1978).

"C.F.R." means the Code of Federal Regulations.

"F.R." means the Federal Register.

"Flame retardant agent" comprises expandable graphite, ammonium polyphosphate, and at least one organophosphorus flame retardant.

"Expandable graphite" means heat-expandable graphite in the form of flakes.

"Ammonium polyphosphate" generally refers to standard ammonium polyphosophate and microencapsulated ammonium polyphosphate.

"Standard ammonium polyphosphate" means ammonium polyphosphate which has not been treated for moisture sensitive applications.

"Microencapsulated ammonium polyphosphate" means ammonium polyphosphate which has been treated for moisture sensitive applications.

"Functionality" means the number of reactive sites for a moiety in a chemical compound.

"Organophosphorus flame retardant" means a reactive phosphorous polyol that has reactive hydrogen atoms with a functionality from about 2 to about 8 and a hydroxyl number from about 50 to about 2000.

"Fire performance" means the performance of resulting polyurethane foam which is used for as a cushioning application material under testing criteria by the FRA (passenger cars and locomotive cabs), FTA (transit bus and van materials), and NFPA (fixed guideway transit and passenger rail systems) for these respective uses as indicated.

"Flame Spread Index" is also known as Radiant Panel Index or 1, as per ASTM D 3675 which is incorporated by reference herein. Flame Spread Index is defined as product of the flame spread factor ($F_s$) and the heat evolution factor (Q) where $1_s = F_s \times Q$.

"Flaming dripping" means periodic dripping of flaming material from the site of material burning or material installation as per 67 F.R. 122 (Jun. 25, 2002) (also published at 49 CFR 238.103 (2008), 58 F.R. 201, 54250-54254, and NFPA 130 Standard for Fixed Guideway Transit and Passenger Rail Systems (2007) which is incorporated by reference herein.

"Flaming running" means continuous flaming material leaving the site of material burning or material installation as per 67 F.R. 122 (Jun. 25, 2002) (also published at 49 CFR 238.103 (2008), 58 F.R. 201, 54250-54254, and NFPA 130 Standard for Fixed Guideway Transit and Passenger Rail Systems (2007) which is incorporated by reference herein. For the purposes herein, the term "material" refers to flexible open-cell polyurethane foam.

"Specific optical density of smoke" is measured under both flaming mode and non-flaming mode as $D_s$ and $D_{max}$) (corr) during testing in accordance with ASTM E 662 which is incorporated by reference herein. Specific optical density of smoke is also generally referred to as smoke density or smoke emission.

"Reduced heat release rate" means the reduction of heat release rate parameters when subjected to an oxygen consumption calorimeter testing using a cone calorimeter during testing in accordance with ASTM E 1354 and ASTM E 1474 which are incorporated by reference herein.

"FRA" means the Federal Railroad Administration.

"FTA" means the Federal Transit Administration.

"NFPA" means the National Fire Protection Association.

"Material" when used in connection with the testing criteria for FRA, FTA, and NFPA fire performance testing criteria means the resulting polyurethane foam.

"Fly ash formation" means flying expandable graphite ash in the air which generally occurs during the combustion of polyurethane foam comprising expandable graphite.

"Intumescent char layer" means a solid, swollen char layer that acts as a barrier to burning of the polyurethane foam and which protects the interior layers of the polyurethane foam when the polyurethane foam is exposed to an ignition source.

"MDI" means diphenylmethane diisocyanate which is also known as methylene diphenyl diisocyanate.

"PMDI" means a polymeric diphenylmethane diisocyanate which is a 2,4' rich polymeric MDI.

"TDI" means toluene diisocyanate in the form of 2,4- and 2,6-isomers in the ratio of 80:20 or 65:35.

"$H_{12}MDI$" means dicyclohexylmethane-4,4'-diisocyanate.

"HDI" means hexamethylene diisocyanate.

"Polyisocyanate" means an organic polyisocyanate wherein the organic component is aliphatic, aromatic, or cycloaliphatic. The polyisocyanate has a plurality of isocyanate groups.

"IFD" means indentation force deflection which is measured during testing in accordance with ASTM D 3574 which is incorporated by reference herein.

The "isocyanate index" means the actual amount of polyisocyanate used divided by the theoretically required stoichiometric amount of free isocyanate moiety required to react with the active hydrogen moiety multiplied by one hundred. For example, an isocyanate index of 100 means that the ratio of the isocyanate moiety of the polyisocyanate to the active hydrogen moiety is 1.0.

A "foaming agent" comprises at least one blowing agent, at least one surface active agent, and at least one catalyst, and, optionally, at least one crosslinker.

A "blowing agent" means either a primary blowing agent or an auxiliary blowing agent as defined herein.

A "primary blowing agent" means water which is used as a blowing agent.

An "auxiliary blowing agent" produces gases to expand the polyurethane foam and make it softer or lighter.

A "surface active agent" is a surfactant that regulates the cell size and structure of the resulting polyurethane foam. The surface active agent enhances miscibility of the polyoxyalkylene polyether polyol, organic polyisocyanate, and foaming agent through emulsification and facilitates the production of the resulting polyurethane foam by lowering the surface tension of the ingredients.

A "catalyst" regulates the reaction for producing the resulting polyurethane foam.

An "isocyanate" means the functional group of —N=C=0.

A "polyisocyanate" means an organic polyisocyanate compound which has a plurality of isocyanate groups.

A "polyol" generally means a polyoxyalkylene polyether polyol comprising a plurality of hydroxyl end groups with active hydrogen atoms with a molecular weight in the range from about 1,000 to about 8,000 and with reactive hydrogens having a functionality of from about 2 to about 8 and a hydroxyl number of from about 20 to about 75.

A "system polyol" means a blend of polyoxyalkylene polyether polyols with a foaming agent.

A "crosslinker" means an agent used to facilitate the linking of the polyoxyalkylene polyether polyol with the polyisocyanate. The crosslinker is a difunctional or trifunctional compound having average molecular weights from about 20 to about 400.

A "foam" generally means a flexible open-cell polyurethane foam.

A "polyurethane foam" generally means a flexible open-cell polyurethane foam.

A "flexible polyurethane foam" generally means a flexible open-cell polyurethane foam.

A "molded foam" is a flexible open-cell polyurethane foam which is in molded form.

A "slabstock foam" or "slabstock" is a flexible open-cell polyurethane foam which is in slabstock form.

A "resulting polyurethane foam" means a polyurethane foam which is produced by a process which comprises reacting at least one polyoxyalkylene polyether polyol, at least one organic polyisocyanate, and at least one foaming agent and further in the presence of at least one flame retardant agent.

A "viscoelastic foam" means a slow recovery foam. When a weighted object is positioned on viscoelastic foam, the foam progressively conforms to the shape of the object. After the weight is removed, the viscoelastic foam slowly reassumes its initial shape, hence exhibiting a slow recovery.

1. Compositions

A. Flame Retardant Agent

In a general embodiment, a flame retardant agent for a resulting polyurethane foam comprises expandable graphite, at least one ammonium polyphosphate, and, at least one organophosphorus flame retardant. In another related general embodiment, the resulting polyurethane foam which is comprised of the flame retardant agent has a flame spread index ($I_s$) of less than or equal to 25 during testing in accordance with ASTM D 3675. In yet another related general embodiment, the specific optical density of smoke value ($D_s$) of the resulting polyurethane foam during testing in accordance with ASTM E 662 is less than or equal to 100 for flaming mode and non-flaming mode at 1.5 minutes. In still another related embodiment, the specific optical density of smoke value ($D_s$) of the resulting polyurethane foam during testing in accordance with ASTM E 662 is less than or equal to 175 under flaming mode and non-flaming mode at 4.0 minutes (note: this also satisfies the FTA testing criteria wherein the specific optical density of smoke value ($D_s$) of the resulting polyurethane foam during testing in accordance with ASTM E 662 is less than or equal to 200 under flaming mode and non-flaming mode at 4.0 minutes).

In yet another general embodiment, because the organophosphorus flame retardant in the flame retardant agent is chemically bound and the expandable graphite and ammonium polyphosphate are physically bound to the polyurethane matrix, these constituents which comprise the flame retardant agent cannot evaporate or otherwise migrate out of the resulting polyurethane foam.

In testing, the resulting polyurethane foam produced satisfactory fire performance results which meet the testing criteria of the FRA, FTA, and NFPA.

In an embodiment, expandable graphite has a flake size of from about 0.044 mm (about 44 microns) to about 2.0 mm (about 2000 microns). In another related embodiment, the expandable graphite is generally used and in an amount of from about 20 to about 40 parts by weight per 100 parts by weight of the polyoxyalkylene polyether polyol. In yet another related embodiment, the expandable graphite is used in an amount of from about 30 to about 40 parts by weight per 100 parts by weight of the polyoxyalkylene polyether polyol. In still another related embodiment, expandable graphite is used in an amount of about 35 parts by weight per 100 parts by weight of the polyoxyalkylene polyether polyol.

In an embodiment, the ammonium polyphosphate is a standard ammonium polyphosphate or a microencapsulated ammonium polyphosphate. In another related embodiment, the ammonium polyphosphate is used in an amount from about 10 parts by weight to about 30 parts by weight per 100 parts by weight of the polyoxyalkylene polyether polyol. In yet another alternate related embodiment, the ammonium polyphosphate is used in an amount of from about 12 to about 25 parts by weight per 100 parts by weight of the polyoxyalkylene polyether polyol. In still yet another alternate related embodiment, ammonium polyphosphate is used in an amount of about 18 parts by weight per 100 parts by weight of the polyoxyalkylene polyether polyol.

Examples of standard ammonium phosphate include, but are not limited to, Exolit® AP 422 from Clariant Corporation. Examples of microencapsulated ammonium polyphosphate include, but are not limited to, Exolit® AP 462 from Clariant Corporation.

In an embodiment, the organophosphorus flame retardant of the flame retardant agent is comprised of at least one reactive phosphorus polyol. In a related embodiment, the organophosphorus flame retardant is used in the amount of from about 20 parts to about 40 parts by weight per 100 parts by weight of the polyoxyalkylene polyether polyol. In yet another related embodiment, the organophosphorus flame retardant is used in an amount of from about 22 to about 30 parts by weight per 100 parts by weight of the polyoxyalkylene polyether polyol. In still another related embodiment, organophosphorus flame retardant is used in an amount of about 25 parts by weight per 100 parts by weight of the polyoxyalkylene polyether polyol. Examples of reactive phosphorus polyols include, but are not limited to, Exolit® OP 550 (hydroxyl number: max 170 mg KOH/g) and Exolit® OP 560 (hydroxyl number: 300-500 mg KOH/g) from Clariant Corporation.

B. Flame Retardant Composition

In a general embodiment, a flame retardant composition for producing a resulting polyurethane foam comprises at least one polyoxyalkylene polyether polyol, at least one organic polyisocyanate, and at least one foaming agent and at least one flame retardant agent.

In another general embodiment, when the flame retardant agent has been added to the polyoxyalkylene polyether polyol, organic polyisocyanate, and foaming agent to produce a resulting polyurethane foam, the resulting polyurethane foam is more difficult to ignite and the foam will burn less rapidly or lose less weight when ignited due to an intumescent char layer which is formed. Fly ash formation is not observed when the resulting polyurethane foam is ignited. Random orientation of expandable graphite flakes occur throughout the foam matrix of the resulting polyurethane foam, including, but not limited to, occupying cell ribs, and do not affect the serviceability of the resulting polyurethane foam, including with respect to fire performance and meeting the FTA, FRA, and NFPA testing criteria. Testing of the resulting polyurethane foam is further described herein.

In an embodiment, the flame retardant composition does not include an anti-settling agent. Examples of anti-settling agents include fatty acid ester and/or amide. Examples of fatty acid esters include, but are not limited to, castor oil derivatives such as hydrogenated castor oil.

In another general embodiment, different kinds of polyoxyalkylene polyether polyol and organic polyisocyanate are used in the flame retardant composition to form different kinds of flexible polyurethane foams. Examples of different kinds of polyurethane foams include resulting polyurethane foams that are molded and slabstock.

1. Polyoxyalkylene Polyether Polyol

In an embodiment, at least one polyoxyalkylene polyether polyol is used for producing the polyurethane foam. In another related embodiment, the polyoxyalkylene polyether polyol has a molecular weight of from about 1000 to about 8000. Examples of polyoxyalkylene polyether polyols include, but are not limited to, Arcol® R-3580 (a blend of polyoxyalkylene polyether polyols, polymer, acrylonitrile, and styrene) from Bayer MaterialScience LLC, Multranol® 3901 (a polyoxyalkylene polyether polyol specially modified with ethylene oxide with a functionality 3, typical hydroxyl number 28, typical molecular weight 6000) from Bayer MaterialScience LLC, Multranol® 9199 polyether polyol (a polyoxyalkylene polyether polyol specially modified with ethylene oxide with a functionality 3, typical hydroxyl number 37, typical molecular weight of 4525) from Bayer MaterialScience LLC, and Carp® GP 3008 (a polyoxyalkylene polyether polyol, hydroxyl number 56, molecular weight 3000) available from Carpenter Company.

In an embodiment, a system polyol is used which includes a polyoxyalkylene polyether and a foaming agent, as defined above. Examples of system polyols include, but are not limited to, system polyols such as Specflex® NF 766 from Dow Chemical Corporation (a blend of polyoxyalkylene polyether polyols on the order of from about 60% to about 100% of the total composition), F 210-11 system polyol from Otto Bock Schaumsysteme GmbH/Otto Bock Polyurethane Technologies (a blend of polyoxyalkylene polyether polyols), LLC.

2. Organic Polyisocyanate

In another related embodiment, at least one organic polyisocyanate is used to produce a resulting polyurethane foam. In still another related embodiment, the amount of organic polyisocyanate used is calculated using an isocyanate index which is selected according to desired characteristics of the resulting polyurethane foam. In yet another related example, the isocyanate index of from about 70 to about 130. Examples of organic polyisocyanates include crude MDI (a polymeric MDI) which is available from Bayer MaterialScience LLC; Voralux® HE 150 polyisocyanate (comprised of approximately 75% MDI) which is available from the Dow Chemical Company; Mondur MRS-4 polyisocyanate (comprised of a 2,4' rich PMDI) from Bayer MaterialScience LLC; 25 OBF 210-11 (comprised of a mixture of MDI and mixed isomers of 4,4'-MDI) which is available from Otto Bock Schaumsysteme GmbH/Otto Bock Polyurethane Technologies, LLC; PMDI which is available from Bayer MaterialScience LLC; TDI which is available from BASF Corporation; HDI which is available from Bayer MaterialScience LLC; and $H_{12}MDI$ which is available from Bayer MaterialScience LLC.

3. Foaming Agent

In a general embodiment, a foaming agent comprises at least one blowing agent, at least one surface active agent, at least one catalyst, and, optionally, at least one crosslinker for producing the resulting polyurethane foam. In another related embodiment, an effective amount of the foaming agent is used to produce the resulting polyurethane foam.

In an embodiment, the blowing agent comprises a primary blowing agent and, optionally, at least one auxiliary blowing agent. In a related embodiment, an effective amount of the primary blowing agent is used. In another related embodiment, the amount of primary blowing agent that is used ranges from about 0.5 to about 7 parts by weight, based on 100 parts by weight of the polyoxyalkylene polyether polyol. In still another related embodiment, the primary blowing agent is water.

In a related embodiment, an effective amount of auxiliary blowing agent is used. In yet another related embodiment, the amount of auxiliary blowing agent is about 5 parts by weight, based on 100 parts by weight of the polyoxyalkylene polyether polyol. In still another related embodiment, the auxiliary blowing agent is at least one gas or at least one low temperature boiling solvent which is inert toward the organic polyisocyanate and has a boiling point below 100° C. at normal atmospheric pressure. In yet another related embodiment, the gas is carbon dioxide is generated from the reaction between the primary blowing agent and the isocyanate moieties of the organic polyisocyanate. In still another related embodiment, the low temperature boiling solvent is selected from the group comprising methylene chloride, acetone, pentane, isopentane, and hydrofluorocarbons. In another related embodiment, Forane® 141b from ELF Atofina is used as an auxiliary blowing agent.

In an embodiment, the surface active agent is a surfactant which is used for regulating cell size and structure of the resulting polyurethane foam. In another related embodiment, the surface active agent is used in an effective amount. In yet another related embodiment, the surface active agent is used in the amount of from about 1 parts by weight to about 1.5 parts by weight, based on 100 parts by weight of the polyoxyalkylene polyether polyol. Examples of the surface active agent include, but are not limited to, Tegostab® B 8715 LF 2 available from Evonik Goldschmidt Corporation and DABCO® DC 5169 available from Air Products and Chemicals, Inc.

In an embodiment, at least one catalyst regulates the reaction for producing the resulting polyurethane foam. In a related embodiment, an effective amount of catalyst is used to produce the resulting polyurethane foam. In yet another related embodiment, the catalyst is an organometallic tin catalyst which is used in the amount of from about 0.05 to about 0.50 parts by weight, based on 100 parts by weight of the polyoxyalkylene polyether polyol. Examples of organometallic tin catalysts include, but are not limited to, DABCO® T-12 from Air Products and Chemicals, Inc.

In an embodiment, the catalyst is an amine catalyst which is used in an amount of from about 0.1 parts by weight to about 1.5 parts by weight, based on 100 parts by weight of the polyoxyalkylene polyether polyol. Examples of amine catalysts include, but are not limited to, DABCO® 33LV and DABCO® BL-11 from Air Products and Chemicals, Inc. In another embodiment, DABCO® 33LV is used in an amount of from about 0.25 parts by weight to about 1.5 parts by weight, based on 100 parts by weight of the polyoxyalkylene polyether polyol. In yet another embodiment, DABCO® BL-11 is used in an amount of from about 0.01 parts by weight to about 0.50 parts by weight, based on 100 parts by weight of the polyoxyalkylene polyether polyol.

In an embodiment, at least one crosslinker is used to facilitate the linking of the polyoxyalkylene polyether polyol with the organic polyisocyanate. In a related embodiment, an effective amount of crosslinker is used to produce the resulting polyurethane foam. In another related embodiment, the crosslinker is used in an amount of about 1 part by weight, based on 100 parts by weight of the polyoxyalkylene polyether polyol. Examples of crosslinkers include, but are not limited to, diethanolamine, triethanolamine, and butanediol.

2. Process for Producing a Resulting Polyurethane Foam

In a general embodiment, a process for producing a resulting polyurethane foam which comprises reacting at least one polyoxyalkylene polyether polyol, at least one organic polyisocyanate, and at least one foaming agent and further in the presence of at least one flame retardant agent. For the purposes herein, the embodiments relating to the polyoxyalkylene polyether polyol, organic polyisocyanate, foaming agent, and flame retardant agent are incorporated by reference herein.

In an embodiment, the process for producing a resulting polyurethane foam does not include reacting an anti-settling agent. Examples of anti-settling agents include fatty acid ester and/or amide. Examples of fatty acid esters include, but are not limited to, castor oil derivatives such as hydrogenated castor oil.

In a general embodiment for producing a resulting polyurethane foam in the form of a molded foam, at least one polyoxyalkylene polyether polyol is used. Examples of polyoxyalkylene polyether polyols include, but are not limited to, Specflex® NF 766 system polyol, F 210-11 system polyol, Arcol® R-3580, Multranol® 3901, and Multranol® 9199. In a related general embodiment, at least one polysiocyanate is used. Examples of organic polyisocyanate include, but are not limited to, Voralux® HE 150 and OBF 210-11.

In a general embodiment for producing a resulting polyurethane foam in the form of a slabstock foam, at least one polyoxyalkylene polyether polyol is used. Examples of polyoxyalkylene polyether polyols include Specflex® NF 766 system polyol, F 210-11 system polyol, Arcol® R-3580, Multranol® 3901, Multranol® 9199, and Carpol® GP 3008. In a related general embodiment, at least one organic polyisocyanate is used. Examples of organic polyisocyanate include, but are not limited to, Voralux® HE 150, OBF 210-11, TDI, and Mondur MRS-4.

In a general embodiment, the resulting polyurethane foam has a density of from about from about 2 pounds per cubic feet to about 30 pounds per cubic feet. In yet another embodiment, the polyurethane foam has a density of from about 3 pounds per cubic feet to about 15 pounds per cubic feet. In still another related embodiment, the polyurethane foam has a density of from about 4 pounds per cubic feet to about 10 pounds per cubic feet.

In a general embodiment, the resulting polyurethane foam is produced by a one-shot method, two-component system method, prepolymer method, or a variable pressure batch process, as described herein.

A. One-Shot Method

In an embodiment, the resulting polyurethane foam, whether molded or slabstock, is produced by a one-shot method. The polyoxyalkylene polyether polyol, organic polyisocyanate, and foaming agent are mixed in the further presence of at least one flame retardant agent and then extruded into a mold for a molded foam or extruded into a large box for a slabstock foam. In another embodiment, the resulting polyurethane foam is produced by feeding these ingredients separately into a mix head and then mixing the ingredients. In yet another embodiment, the resulting polyurethane foam is produced by feeding these ingredients in different stream combinations into a mix head and then mixing the ingredients.

i. Two-Component System Method

In a related embodiment, the resulting polyurethane foam, whether molded or slabstock, is produced by a commercially available two-component system polyol-organic polyisocyanate system. Commercially available "Component A" comprises the organic polyisocyanate and commercially available "Component B" comprises the polyoxyalkylene polyether polyol and foaming agent. Either Component A or Component B is mixed in the further presence of the flame retardant agent and then mixed with remaining Component A or B. This mixture is then discharged into a mold for molded foam or a large box for slabstock foam. In another related embodiment, the ingredients which comprise the flame retardant agent is added to Component A, Component B, or a combination of both.

B. Prepolymer Method

In an embodiment, the resulting polyurethane foam, whether molded or slabstock, is produced by a prepolymer method. A prepolymer is formed by reacting the organophosphorus flame retardant, the organic polyisocyanate, and a portion of a catalyst, to form a prepolymer. In a related embodiment, a component is produced by mixing the surface active agent, blowing agent, and remaining portion of the catalyst with ammonium polyphosphate, expandable graphite, and polyoxyalkylene polyether polyol. In a related embodiment, the catalyst is an organometallic tin catalyst. In still another related embodiment the prepolymer and the component are then reacted to produce the resulting polyurethane foam in the form of a molded or slabstock foam. In another related embodiment, a system polyol may be used in substitution for the polyoxyalkylene polyether polyol.

In an alternate embodiment, the resulting polyurethane foam, whether molded or slabstock, is produced by a prepolymer method. A prepolymer is formed by reacting the polyisocyanate with a portion of the polyoxyalkylene polyether polyol and a portion of a catalyst. In a related embodiment, a component is produced by mixing the remainder portion of the polyoxyalkylene polyether polyol, flame retardant agent, and remaining portion of the catalyst, surface active agent, and the blowing agent. In a related embodiment, the catalyst used in the foaming agent is an organometallic tin catalyst. In still another related embodiment the prepolymer and the component are then reacted to produce the resulting polyurethane foam in the form of molded or slabstock. In another related embodiment, a system polyol may be used in substitution for the polyoxyalkylene polyether polyol.

C. Variable Pressure Batch Process

In an embodiment, the resulting polyurethane foam in slabstock form is produced by using a variable pressure batch process. A portion of the polyoxyalkylene polyether polyol and polyisocyanate are mixed in the further presence of expandable graphite and ammonium polyphosphate and poured into a mixing pot. The remaining portion of the polyoxyalkylene polyether polyol, organophosphorus flame retardant, and foaming agent are then metered into the mixing pot and mixed. This mixture is then extruded into a large mold under variable vacuum and pressure settings (also referred to as a "variable pressure batch process") to control the density and firmness of the resulting polyurethane foam.

In a related embodiment, a continuous production machine may also be used to produce the resulting polyurethane foam in continuous slabstock form. In another related embodiment, the ingredients of the flame retardant agent are added to the portion of the polyoxyalkylene polyether polyol, the remaining portion of the polyoxyalkylene polyether polyol, or a combination of both.

D. Examples of Resulting Polyurethane Foams

In a general embodiment, during testing, the resulting polyurethane foam produced satisfactory fire performance results which met the testing criteria of the FRA, FTA, and NFPA.

In an embodiment, the resulting polyurethane foam is a molded foam. Preheated aluminum molds are used in the production of the molded foam. In a related embodiment, the molded foam is in the form of a seat back, a seat bottom, or a seat armrest. In a related embodiment, the aluminum molds have dimensions of about 18 inch×18 inch×4 inch and 10 inch×9 inch×4.75 inch. In another related embodiment, the aluminum molds are preheated heated to a temperature range from about 135° F. to about 145° F. In yet another related embodiment, the flame retardant composition is added to preheated aluminum molds and then the resulting polyurethane foam was removed from the aluminum molds after about 6 to about 8 minutes.

In an embodiment, the resulting polyurethane foam is a slabstock foam. Preheated cardboard boxes at about 135° F. are used in the production of the slabstock foam. In a related embodiment, the cardboard boxes have dimensions of about 28 inch×36 inch×4 inch to make slabstock foam slabs for mattress construction. In another related embodiment, the polyoxyalkylene polyether polyol, organic polyisocyanate, and foaming agent and further in the presence of at least one flame retardant agent are mixed and then added to preheated cardboard boxes to obtain a resulting polyurethane foam. The resulting polyurethane foam was removed from the cardboard boxes after about 6 minutes to about 8 minutes. In testing, the resulting polyurethane foam produced satisfactory fire performance results which meet the testing criteria of the FRA, FTA, and NFPA.

3. Resulting Polyurethane Foam Produced by a Flame Retardant Process

In a general embodiment, a resulting polyurethane foam is produced by a flame retardant process comprising reacting at least one polyoxyalkylene polyether polyol, at least one organic polyisocyanate, and at least one foaming agent and further in the presence of at least one flame retardant agent. For the purposes herein, the embodiments relating to the polyoxyalkylene polyether polyol, organic polyisocyanate, foaming agent, and flame retardant agent are incorporated by reference herein.

In an embodiment, a resulting polyurethane foam which is produced by a flame retardant process does not include reacting an anti-settling agent. Examples of anti-settling agents include fatty acid ester and/or amide. Examples of fatty acid esters include, but are not limited to, castor oil derivatives such as hydrogenated castor oil.

In a general embodiment for a resulting polyurethane foam which is produced by a flame retardant process, wherein said resulting polyurethane foam is a molded foam and at least one polyoxyalkylene polyether polyol is used. Examples of polyoxyalkylene polyether polyols include, but are not limited to, Specflex® NF 766 system polyol, F 210-11 system polyol, Arcol® R-3580, Multranol® 3901, and Multranol® 9199. In a related general embodiment, at least one polysiocyanate is used. Examples of organic polyisocyanate include, but are not limited to, Voralux® HE 150 and OBF 210-11.

In a general embodiment for a resulting polyurethane foam which is produced by a flame retardant process, wherein said resulting polyurethane foam is a slabstock foam and at least one polyoxyalkylene polyether polyol is used. Examples of polyoxyalkylene polyether polyols include Specflex® NF 766 system polyol, F 210-11 system polyol, Arcol® R-3580, Multranol® 3901, Multranol® 9199, and Carpol® GP 3008. In a related general embodiment, at least one organic polyisocyanate is used. Examples of organic polyisocyanate include, but are not limited to, Voralux® HE 150, OBF 210-11, TDI, and Mondur MRS-4.

In a general embodiment, the resulting polyurethane foam has a density of from about from about 2 pounds per cubic feet to about 30 pounds per cubic feet. In yet another embodiment, the polyurethane foam has a density of from about 3 pounds per cubic feet to about 15 pounds per cubic feet. In still another related embodiment, the polyurethane foam has a density of from about 4 pounds per cubic feet to about 10 pounds per cubic feet.

In a general embodiment, the resulting polyurethane foam is produced by a one-shot method, two-component system method, prepolymer method, or a variable pressure batch process, as described herein.

A. One-Shot Method

In an embodiment, the resulting polyurethane foam, whether molded or slabstock, is produced by a one-shot method. The polyoxyalkylene polyether polyol, organic polyisocyanate, and foaming agent are mixed in the further presence of at least one flame retardant agent and then extruded into a mold for a molded foam or extruded into a large box for a slabstock foam. In another embodiment, the resulting polyurethane foam is produced by feeding these ingredients separately into a mix head and then mixing the ingredients. In yet another embodiment, the resulting polyurethane foam is produced by feeding these ingredients in different stream combinations into a mix head and then mixing the ingredients.

i. Two-Component System Method

In a related embodiment, the resulting polyurethane foam, whether molded or slabstock, is produced by a commercially available two-component system polyol-organic polyisocyanate system. Commercially available "Component A" comprises the organic polyisocyanate and commercially available "Component B" comprises the polyoxyalkylene polyether polyol and foaming agent. Either Component A or Component B is mixed in the further presence of the flame retardant agent and then mixed with remaining Component A or B. This mixture is then discharged into a mold for molded foam or a large box for slabstock foam. In another related embodiment, the ingredients which comprise the flame retardant agent is added to Component A, Component B, or a combination of both.

B. Prepolymer Method

In an embodiment, the resulting polyurethane foam, whether molded or slabstock, is produced by a prepolymer method. A prepolymer is formed by reacting the organophosphorus flame retardant, the organic polyisocyanate, and a portion of a catalyst, to form a prepolymer. In a related embodiment, a component is produced by mixing the surface active agent, blowing agent, and remaining portion of the catalyst with ammonium polyphosphate, expandable graphite, and polyoxyalkylene polyether polyol. In a related embodiment, the catalyst is an organometallic tin catalyst. In still another related embodiment the prepolymer and the component are then reacted to produce the resulting polyurethane foam in the form of a molded or slabstock foam. In another related embodiment, a system polyol may be used in substitution for the polyoxyalkylene polyether polyol.

In an alternate embodiment, the resulting polyurethane foam, whether molded or slabstock, is produced by a prepolymer method. A prepolymer is formed by reacting the polyisocyanate with a portion of the polyoxyalkylene polyether polyol and a portion of a catalyst. In a related embodiment, a component is produced by mixing the remainder portion of the polyoxyalkylene polyether polyol, flame retardant agent, and remaining portion of the catalyst, surface active agent, and the blowing agent. In a related embodiment, the catalyst used in the foaming agent is an organometallic tin catalyst. In still another related embodiment the prepolymer and the component are then reacted to produce the resulting polyurethane foam in the form of molded or slabstock. In another related embodiment, a system polyol may be used in substitution for the polyoxyalkylene polyether polyol.

C. Variable Pressure Batch Process

In an embodiment, the resulting polyurethane foam in slabstock form is produced by using a variable pressure batch process. A portion of the polyoxyalkylene polyether polyol and polyisocyanate are mixed in the further presence of expandable graphite and ammonium polyphosphate and poured into a mixing pot. The remaining portion of the polyoxyalkylene polyether polyol, organophosphorus flame retardant, and foaming agent are then metered into the mixing pot and mixed. This mixture is then extruded into a large mold under variable vacuum and pressure settings (also referred to as a "variable pressure batch process") to control the density and firmness of the resulting polyurethane foam.

In a related embodiment, a continuous production machine may also be used to produce the resulting polyurethane foam in continuous slabstock form. In another related embodiment, the ingredients of the flame retardant agent are added to the portion of the polyoxyalkylene polyether polyol, the remaining portion of the polyoxyalkylene polyether polyol, or a combination of both.

D. Examples of Resulting Polyurethane Foams

In a general embodiment, during testing, the resulting polyurethane foam produced satisfactory fire performance results which met the testing criteria of the FRA, FTA, and NFPA.

In an embodiment, the resulting polyurethane foam is a molded foam. Preheated aluminum molds are used in the production of the molded foam. In a related embodiment, the molded foam is in the form of a seat back, a seat bottom, or a seat armrest. In a related embodiment, the aluminum molds have dimensions of about 18 inch×18 inch×4 inch and 10 inch×9 inch×4.75 inch. In another related embodiment, the aluminum molds are preheated heated to a temperature range from about 135° F. to about 145° F. In yet another related embodiment, the flame retardant composition is added to preheated aluminum molds and then the resulting polyurethane foam was removed from the aluminum molds after about 6 to about 8 minutes.

In an embodiment, the resulting polyurethane foam is a slabstock foam. Preheated cardboard boxes at about 135° F. are used in the production of the slabstock foam. In a related embodiment, the cardboard boxes have dimensions of about 28 inch 10×36 inch×4 inch to make slabstock foam slabs for mattress construction. In another related embodiment, the polyoxyalkylene polyether polyol, organic polyisocyanate, and foaming agent and further in the presence of at least one flame retardant agent are mixed and then added to preheated cardboard boxes to obtain a resulting polyurethane foam. The resulting polyurethane foam was removed from the cardboard boxes after about 6 minutes to about 8 minutes. In testing, the resulting polyurethane foam produced satisfactory fire performance results which meet the testing criteria of the FRA, FTA, and NFPA.

4. Case Studies

The previous sections are incorporated herein by reference relating to compositions (including flame retardant composition), process for producing a resulting polyurethane foam, and resulting polyurethane foam produced by a flame retardant process.

In a general embodiment, the resulting polyurethane foam is used for cushioning application materials in satisfaction of fire performance testing criteria by the FRA (railway passenger cars and locomotive cabs), FTA (transit bus and van materials), and NFPA (fixed guideway transit and passenger rail systems), for these respective uses. Federal agencies such as FRA, FTA, and nonprofit agencies such as NFPA have identified flame spread and smoke as the key fire response parameters that could pose life threatening situation to the general public. In other words, flame spread originated in one seat cushion in a train across the entire train and toxic fumes and smoke which are generated from a fire could lead to incapacitation and/or death of people in a very short period of time.

The fire performance testing criteria for the FRA, FTA, and NFPA (which are much more stringent than other flammability tests such as the Limiting Oxygen Index determination test, the standard tests within BS 5852, the Boston Chair® type test, and California technical Bulletin 133 type test) are respectively described as follows:

1) The FRA fire performance regulations for the flammability and specific optical density of smoke characteristics of materials used in passenger cars and locomotive cabs is published at 49 C.F.R. § 238.103 (2008) and 67 F.R. 122, 42910-12 (Jun. 25, 2002) ("Appendix B to Part 238-Test Methods and Performance Criteria for the Flammability and Specific optical density Characteristics of Materials Used in Passenger Cars and Locomotive Cabs") and which is incorporated by reference herein:
   a) The material tested for surface flammability does not exhibit any flaming running or flaming dripping.
   b) The Flame Spread Index (l) during testing in accordance with ASTM D 3675 has a value of less than or equal to 25.
   c) Maximum test limits for specific optical density of smoke ($D_s$) during testing in accordance with ASTM E 662 has a value at 1.5 minutes ($D_s$ 1.5 min.) less than or equal to 100 under both flaming mode and non-flaming mode.
   d) Maximum test limits for specific optical density of smoke ($D_s$) during testing in accordance with ASTM E 662 has a value at 4.0 minutes ($D_s$ 4.0 min) less than or equal to 175 under both flaming mode and non-flaming mode.

2) The FTA has recommended fire safety practice criteria for transit bus and van materials selection guidelines as published at 58 F.R. 201, 54250-54254 (1993) and which is incorporated by reference herein:
   a) The material tested for surface flammability does not exhibit any flaming running or flaming dripping.
   b) The Flame Spread Index ($l_s$) during testing in accordance with ASTM D 3675 has a value of less than or equal to 25.
   c) Maximum test limits for specific optical density of smoke ($D_s$) during testing in accordance with ASTM E 662 has a value at 1.5 minutes ($D_s$ 1.5 min.) less than or equal to 100 under both flaming mode and non-flaming mode.
   d) Maximum test limits for specific optical density of smoke ($D_s$) during testing in accordance with ASTM E 662 has a value at 4.0 minutes ($D_s$ 4.0 min) less than or equal to 200 under both flaming mode and non-flaming mode.

3) The NFPA 130 Standard for Fixed Guideway Transit and Passenger Rail Systems (2007) ("NFPA 130") which are testing criteria that are intended to be used to assess the fire risk of certain materials and which is incorporated by reference herein:
   a) The material tested for surface flammability does not exhibit any flaming running or flaming dripping.
   b) The Flame Spread Index ($l_s$) during testing in accordance with ASTM D 3675 has a value of less than or equal to 25.
   c) Maximum test limits for specific optical density of smoke ($D_s$) during testing in accordance with ASTM E 662 has a value at 1.5 minutes ($D_s$ 1.5 min.) less than or equal to 100 under both flaming mode and non-flaming mode.
   d) Maximum test limits for specific optical density of smoke ($D_s$) during testing in accordance with ASTM E 662 has a value at 4.0 minutes ($D_s$ 4.0 min) less than or equal to 175 under both flaming mode and non-flaming mode.

In testing of resulting polyurethane foams made in accordance with the embodiments herein have produced satisfactory fire performance results that met the FRA, FTA, and NFPA testing criteria. The results of the testing for the resulting polyurethane foams are as follows:
   1. No flaming running or flaming dripping during testing of surface flammability was observed in satisfaction of the FRA, FTA, and NFPA testing criteria by meeting the FRA, FTA, and NFPA testing criteria.
   2. Flame Spread index ($l_s$) of less than or equal to 25 during testing in accordance with ASTM D 3675 in satisfaction of the FRA, FTA, and NFPA testing criteria by meeting the FRA, FTA, and NFPA testing criteria. In ASTM D 3675, the test method for surface flammability of flexible cellular materials uses a very intense radiant heat energy source. The ignition source is a horizontally mounted pilot gas burner of 8-9 inch length with 1.5 mm diameter holes equally spaced, the test specimen is mounted in front of an extremely high intensity radiant heat panel exposing a radiating surface of 12 inch×18 inch with the capability of operating at a temperature of 820° C. (1500° F.).
   3. Maximum test limits for specific optical density of smoke ($D_s$) during testing in accordance with ASTM E 662 has a value at 1.5 minutes ($D_s$ 1.5 min.) less than or equal to 100 in satisfaction of the FRA, FTA, and NFPA testing criteria by meeting the FRA, FTA, and NFPA testing criteria.
   4. Maximum test limits for specific optical density of smoke ($D_s$) during testing in accordance with ASTM E 662 has a value at 4.0 minutes ($D_s$ 4.0 min) less than or equal to 175 under both flaming mode and non-flaming mode in satisfaction of the FRA and NFPA testing criteria by meeting the FRA and NFPA testing criteria.

The ASTM E 662 test for specific optical density of smoke is a very crucial test for rail, bus and van cushioning applications as the leading cause of passenger deaths is attributed to smoke inhalation. This is because the single largest fuel load in rail compartments, motor coaches, public transit buses, and vans is polyurethane seating. Conventional polyurethane foam cushions burn with extremely intense heat and flame when exposed to an open flame ignition source producing tremendous amount of heavy toxic smoke which causes severe injury, incapacitation, and death. In the past history, one can find various such incidents that caused significant property damages and passenger deaths. One such incident as reported in the news was the Dallas, Tex. bus fire near Interstate 45 that killed 24 elderly evacuees trying to escape from Hurricane Rita in September, 2005.

The following Examples 1 through 21 and Tables 1 through 8 show that the resulting polyurethane foams made in accordance with the embodiments herein have satisfactory fire performance in view of meeting the FRA, FTA, and NFPA testing criteria and in view of other testing criteria. Additionally, the following examples illustrate that the polyurethane foams not made with the flame retardant agent have unsatisfactory fire performance in view of not meeting the FRA, FTA, and NFPA testing criteria.

In Examples 1 through 19 and Tables 1 through 6 the following ingredients were used as indicated in the respective examples and tables:

(a) System polyol, Specflex® NF766 from Dow Chemical Corporation.
(b) Polyoxyalkylene polyether polyol, Multranol® 3901 (functionality 3, typical hydroxyl number 28, typical molecular weight 6000) from Bayer MaterialScience LLC.
(c) Polyether polyol mixture, Arcol® Polyol R-3580 (a blend of 3 polyether polyols, a polymer and acrylonitrile and styrene) from Bayer MaterialScience LLC.
(d) Polyoxyalkylene polyether polyol, Multranol® 9199 (functionality 3, typical hydroxyl number 37, typical molecular weight 4525) from Bayer MaterialScience LLC.
(e) Organophosphorus flame retardant, Exolit® OP 560 reactive flame retardant with functionality of approximately 2 (hydroxyl number 300 to 500) from Clariant Corporation.
(f) Expandable graphite, Grade 3772 Typical analysis: 18 Mesh (1000 microns or 1.00 mm) 2.54%; 30 Mesh (600 micron or 0.600 mm) 13.15%; 40 Mesh (425 microns or 0.425 mm) 44.93%; 50 Mesh (300 microns or 0.300 mm) 29.62%; 80 Mesh (180 micron or 0.180 mm) 7.17%; −80 Mesh (180 microns or 0.180 mm) 2.59% from Asbury Graphite Mills, Inc.
(f*) Expandable graphite, Grade 3494 Typical analysis: 50 Mesh (300 microns or 0.300 mm) 1.6%; 80 Mesh (180 microns or 0.180 mm) 50.29%; 100 Mesh (150 microns or 0.150 mm) 23.56%; 200 Mesh (75 microns or 0.075 mm) 20.52%; 325 Mesh (44 microns or 0.044 mm) 1.76%; −325 Mesh (44 microns or 0.044 mm) 2.28% from Asbury Graphite Mills, Inc.
(f**) Expandable graphite, Grade Grafguard® 160-80N (mean particle size 250 microns or 0.250 mm typical) from GrafTech International Holdings Inc. (formerly Ucar Carbon Company).
(g) Microencapsulated Ammonium polyphosphate, Exolit® AP 462, from Clariant Corporation.
(g*) Standard Ammonium polyphosphate, Exolit® AP 422, from Clariant Corporation.
(h) Amine catalyst, DABCO® 33LV from Air Products and Chemicals, Inc.
(i) Organometallic tin catalyst, DABCO® T-12, an organometallic catalyst from Air Products and Chemicals, Inc.
(j) Amine catalyst, DABCO® BL-11, from Air Products and Chemicals, Inc.
(k) Crosslinker, Diethanolamine, DEOA from Sagar Enterprises, Inc.
(l) Surface active agent, DABCO® DC 5169 from Air Products and Chemicals, Inc.
(m) Surface active agent, Tegostab® B 8715 LF 2 from Evonik Goldschmidt Corporation.
(n) Organic polyisocyanate, Voralux® HE 150 from Dow Chemical Corporation.
(o) Organic polyisocyanate, Mondur® MRS-4 from Bayer MaterialScience LLC.
(p) Toluene diisocyanate (TDI), Lupranate® T80, Type 2 Isocyanate, 80:20 mixture of 2-, 4- and 2,6-toluene diisocyanate from BASF Corporation.
(q) Primary blowing agent, water.
(r) Auxiliary blowing agent, Forane® 141b from ELF Atofina.

The amount listed for each ingredient is parts by weight of the ingredient per 100 parts by weight of the polyoxyalkylene polyether polyol or system polyol (which, as defined above, comprises the polyoxyalkylene polyether polyol and a foaming agent).

Examples 1 to 3

For Examples 1, 2, and 3 as shown in Table 1, resulting polyurethane foam in the form of a molded foam is produced by mixing the ingredients as indicated in the respective examples. A preheated aluminum mold is used in the production of the molded foam. The aluminum mold has a dimension of about 10 inch×9 inch×4.75 inch. The aluminum mold was preheated heated to a temperature range of from about 135° F. to about 145° F.

The ingredients as indicated in respective Examples 1, 2, and 3 are combined by mixing microencapsulated ammonium polyphosphate (Exolit® AP 462 from Clariant Corporation) with expandable graphite (Grade 3772 available from Asbury Graphite Mills, Inc.) in the respective amounts indicated in Table 1 with system polyol (Specflex® NF766 from Dow Chemical Corporation) (which includes a foaming agent) in the presence of an amine catalyst (DABCO® 33LV from Air Products and Chemicals, Inc.) and an organometallic tin catalyst (DABCO® T-12 from Air Products and Chemicals, Inc.). Organophosphorus flame retardant (Exolit® OP 560 reactive flame retardant) was then added to the mixture followed by Voralux® HE 150 and mixed.

This mixture then added to preheated aluminum molds and cured by passing through a heat chamber for about 6 minutes to about 8 minutes set at a temperature of about 125° F. The resulting polyurethane foams are then removed from the aluminum molds.

In testing of the resulting polyurethane foams of Examples 1, 2, and 3, the resulting polyurethane foam produced satisfactory fire performance results which met the testing criteria the FRA, FTA, and NFPA. The physical and fire characteristics of the resulting polyurethane foam are shown in Table 1. As shown in Table 1, Flame Spread Index ($I_s$) values were below 25 with no flaming running or flaming dripping and specific optical density of smoke values ($D_s$) were below 100 at 1.5 minutes and below 175 at 4.0 minutes.

TABLE 1

The effect of relative amounts of flame retardant ingredients on physical and flammability characteristics of the resulting polyurethane foam.

| Examples | 1 | 2 | 3 |
|---|---|---|---|
| Isocyanate Index | 80 | 80 | 80 |
| Ingredients | | | |
| System polyol (a) | 100 | 100 | 100 |
| Amine catalyst (h) | .025 | .025 | .025 |
| Organometallic tin catalyst (i) | 0.05 | 0.05 | 0.05 |
| Expandable Graphite (f) | 36 | 35 | 30 |
| Ammonium polyphosphate (g) | 12 | 18 | 25 |
| Organophosphorus Flame retardant (e) | 30 | 25 | 23 |
| Organic polyisocyanate (n) | 80.4 | 76.8 | 75.3 |
| Physical Characteristics | | | |
| Density (pcf) (as per ASTM D 3574-Test A) | 4.39 | 4.40 | 4.53 |
| IFD at 25% at 4 inch (lbs) (as per ASTM D 3574-Test $B_1$) | — | 40.4 | 30.9 |
| Tensile strength (lb/sq.in) (as per ASTM D 3574-Test E) | 12.9 | 11.0 | 10.2 |
| Elongation (%) (as per ASTM D 3574-Test E) | 40 | 52 | 46 |

TABLE 1-continued

The effect of relative amounts of flame retardant ingredients on physical and flammability characteristics of the resulting polyurethane foam.

| Examples | 1 | 2 | 3 |
|---|---|---|---|
| Isocyanate Index | 80 | 80 | 80 |
| Resilience (%)(as per ASTMD 3574-Test H) | 43 | 43 | 47 |
| Flame Spread Index ($I_s$) (as per ASTM D 3675) | 7.50 | 7.50 | 6.75 |
| Specific optical density of smoke | | | |
| $D_s$ 1.5 min (Non-flaming mode) (as per ASTM E 662) | 94 | 95 | 92 |
| $D_s$ 4.0 min (Non-flaming mode) (as per ASTM E 662) | 165 | 165 | 171 |
| $D_s$ 1.5 min (Flaming mode) (as per ASTM E 662) | 76 | 58 | 64 |
| $D_s$ 4.0 min (Flaming mode) (as per ASTM E 662) | 162 | 159 | 169 |

Examples 4-7

For Examples 4, 5, 6, and 7 as referenced in Table 2, resulting polyurethane foams in the form of molded foams are respectively prepared with isocyanate index values as indicated and ingredients in the amounts indicated. As with Table 1, the amount listed for each ingredient is parts by weight of the ingredient per 100 parts by weight of the system polyol. Otherwise, Table 2 lists the same ingredients as listed and described in connection with Table 1 and these ingredients are mixed in the same manner as described in connection with Table 1.

A preheated aluminum mold is used in the production of the molded foam. The aluminum mold has a dimension of about 18 inch×18 inch×4 inch. The aluminum mold is preheated heated to a temperature range of from about 135° F. to about 145° F.

The mixture was then added to preheated aluminum molds and then cured by passing through a heat chamber set at a temperature of about 125° F. for about 6 minutes to about 8 minutes. The resulting polyurethane foam is then removed from the aluminum mold for Examples 4, 5, 6, and 7. In testing of Examples 4, 5, 6, and 7, the resulting polyurethane foam produced in satisfactory fire performance results which met the testing criteria the FRA, FTA, and NFPA. The physical and fire characteristics of the resulting polyurethane foam are shown in Table 2.

As shown in the Table 2, resulting polyurethane foam in Examples 4 through 7 were prepared with an isocyanate index of 70, 80, 90, and 100 and exhibited Flame Spread Index ($I_s$) values below 10 with no flaming running or flaming dripping and specific optical density of smoke values ($D_s$) for flaming mode and non-flaming mode during testing in accordance with ASTM E 662 below 100 at 1.5 minutes and below 175 at 4.0 minutes. The maximum corrected specific optical density of smoke value is $D_{max}$ (con) for flaming mode and non-flaming mode during testing in accordance with ASTM E 662 as shown in Table 2.

Accordingly, the resulting polyurethane foams of Examples 4, 5, 6, and 7 produced satisfactory results in terms of meeting the testing criteria of the FRA, ETA, and NFPA.

TABLE 2

The effect of isocyanate index variation on physical and flammability characteristics of the resulting polyurethane foam.

| Examples | 4 | 5 | 6 | 7 |
|---|---|---|---|---|
| Isocyanate Index | 70 | 80 | 90 | 100 |
| Ingredients | | | | |
| System polyol (a) | 100 | 100 | 100 | 100 |
| Amine catalyst (h) | 0.25 | 0.25 | 0.25 | 0.25 |
| Organometallic tin catalyst (i) | 0.05 | 0.05 | 0.05 | 0.05 |
| Graphite (f) | 35 | 35 | 35 | 35 |
| Ammonium polyphosphate (g) | 18 | 18 | 18 | 18 |
| Organophosphorus Flame retardant (e) | 25 | 25 | 25 | 25 |
| Organic polyisocyanate (n) | 67.2 | 76.8 | 86.4 | 96.0 |
| Physical characteristics | | | | |
| Density (pcf) (as per ASTM D 3574-Test A) | 4.68 | 4.60 | 4.71 | 4.76 |
| IFD at 25% at 4 inch (lbs) (as per ASTM D 3574-Test $B_1$) | 29.4 | 51.3 | 71.8 | 86.6 |
| Tensile strength (lb/sq.in) (as per ASTM D 3574-Test E) | 8.3 | 12.7 | 16.0 | 24.0 |
| Elongation (%)(as per ASTM D 3574-Test E) | 60 | 49 | 49 | 55 |
| Resilience (%)(as per ASTM D 3574-Test H) | 46 | 46 | 44 | 42 |
| Compression Set (%) (as per ASTM D 3574-Test D, 50% constant deflection) | 23.1 | 18.2 | 17.8 | 20.0 |
| Flame Spread Index ($I_s$) (as per ASTM D 3675) | 7.01 | 8.21 | 7.78 | 8.50 |
| Specific optical density of smoke | | | | |
| $D_s$ 1.5 min (Non-flaming mode) (as per ASTM E 662) | 80 | 79 | 84 | 89 |
| $D_s$ 4.0 min (Non-flaming mode) (as per ASTM E 662) | 132 | 134 | 146 | 150 |
| $D_{max}$ (corr) (Non-flaming mode) (as per ASTM E 662) | 154 | 158 | 163 | 167 |
| $D_s$ 1.5 min (Flaming mode) (as per ASTM E 662) | 68 | 63 | 67 | 48 |
| $D_s$ 4.0 min (Flaming mode) (as per ASTM E 662) | 144 | 149 | 156 | 135 |
| $D_{max}$ (corr) (Flaming mode) (as per ASTM E 662) | 180 | 184 | 185 | 169 |

Examples 5 and 8-13

For Examples 5 and 8-13 as referenced in Table 3, a comparison is shown with respect to a resulting polyurethane foam that uses the flame retardant agent (specifically, Examples 5 and 11 through 13) versus polyurethane foams that do not use the flame retardant agent (i.e., each of the polyurethane foams were not formulated with at least one ingredient of the flame retardant agent) (specifically, Examples 8 through 10). The respective ingredients of Examples 5 and 11 through 13 were combined in the same manner as described previously in connection with Examples 1, 2, and 3. The ingredients as indicated in respective Examples 8-10 are combined by mixing two ingredients of the flame retardant agent in the respective amounts indicated in the Table 3 with system polyol (Specflex® NF766 from Dow Chemical Corporation) in the presence of an amine catalyst (DABCO® 33LV from Air Products and Chemicals, Inc.) and an organometallic tin catalyst (DABCO® T-12 from Air Products and Chemicals, Inc.), The respective amount of Voralux® HE 150, calculated based on isocyanate index of 80 was then added and mixed.

Table 3 indicates the amounts listed of the respective ingredients for Examples 5 and 8 through 13.

Only Examples 5 and 11 through 13 show satisfactory fire performance in terms of satisfying the testing criteria of the FTA, FRA, and the NFPA whereas Examples 8 through 10 show unsatisfactory fire performance criteria; accordingly, Examples 8 through 10 do not satisfy the FTA, FRA, and NFPA testing criteria.

The amount listed for each ingredient is parts by weight of the ingredient per 100 parts by weight of the system polyol.

TABLE 3

The effect of individual flame retardant ingredients on physical and flammability characteristics of polyurethane foam.

| Examples | 5 | 8 | 9 | 10 | 11 | 12 | 13 |
|---|---|---|---|---|---|---|---|
| Isocyanate Index | 80 | 80 | 80 | 80 | 80 | 80 | 80 |
| Ingredients | | | | | | | |
| System polyol (a) | 100 | 100 | 100 | 100 | 100 | 100 | 100 |
| Amine catalyst (h) | 0.25 | 0.25 | 0.25 | 0.25 | 0.25 | 0.25 | 0.25 |
| Organometallic tin catalyst (i) | 0.05 | 0.05 | 0.05 | 0.05 | 0.05 | 0.05 | 0.05 |
| Expandable Graphite (f) | 35 | 35 | 35 | — | 35 | — | — |
| Expandable Graphite (f*) | — | — | — | — | — | 35 | — |
| Expandable Graphite (f**) | — | — | — | — | — | — | 35 |
| Ammonium polyphosphate (g) | 18 | 18 | — | 18 | — | 18 | 18 |
| Ammonium polyphosphate (g*) | — | — | — | — | 18 | — | — |
| Organophosphorus Flame retardant (e) | 25 | — | 25 | 25 | 25 | 25 | 25 |
| Organic polyisocyanate (n) | 76.8 | 58.4 | 76.8 | 76.8 | 76.8 | 76.8 | 76.8 |
| Physical characteristics | | | | | | | |
| Density (pcf) (as per ASTM D 3574 - Test A) | 4.60 | 4.60 | 4.50 | 4.34 | 4.72 | 4.66 | 4.15 |
| IFD at 25% at 4 inch (lbs) (as per ASTM D 3574 -Test $B_1$) | 51.3 | 30.82 | 37.84 | 43.35 | 52.9 | 30.20 | 31.68 |
| Resilience (%) (as per ASTM D 3574-Test H) | 46 | 48 | 43 | 37 | 47 | 35 | 43 |
| Tensile strength (lb/sq. in) (as per ASTM D 3574 - Test E) | 12.7 | 9.1 | 11.2 | 14.2 | 12.8 | 11.7 | 13.5 |
| Elongation (%)(as per ASTM 3574 D - Test E) | 49 | 51 | 52 | 56 | 46 | 64 | 54 |
| Resilience (%)(as per ASTM 3574 D - Test H) | 46 | 48 | 43 | 37 | 47 | 35 | 43 |
| Compression Set (%) (as per ASTM D 3574-Test D, 50% constant deflection) | 18.2 | 15.7 | 25.7 | 14.6 | 21.0 | 24.5 | 21.1 |
| Flame Spread Index ($I_s$) (as per ASTM D 3675) | 8.21 | 425.6 | 442.8 | 682.8 | 9.04 | 16.0 | 11.0 |
| Specific optical density of smoke | | | | | | | |
| $D_s$ 1.5 min (Non-flaming mode) (as per ASTM E 662) | 79 | 63 | 66 | 59 | 82 | 98 | 96 |
| $D_s$ 4.0 min (Non-flaming mode) (as per ASTM E 662) | 134 | 106 | 113 | 167 | 140 | 157 | 159 |
| $D_{max}$ (corr) (Non-flaming mode) (as per ASTM E 662) | 158 | 124 | 153 | 179 | 162 | 191 | 182 |
| $D_s$ 1.5 min (Flaming mode) (as per ASTM E 662) | 63 | 25 | 58 | 309 | 61 | 49 | 54 |
| $D_s$ 4.0 min (Flaming mode) (as per ASTM E 662) | 149 | 80 | 130 | 355 | 155 | 155 | 152 |
| $D_{max}$ (corr) (Flaming mode) (as per ASTM E 662) | 184 | 115 | 158 | 346 | 193 | 206 | 200 |

Examples 8 Through 10, not Using at Least One Ingredient of Flame Retardant Agent (Examples 8, 9 and 10).

As shown in Table 3, Examples 8, 9, and 10 are polyurethane foams that were formulated without at least one ingredient of the flame retardant agent (i.e., expandable graphite, organophosphorus flame retardant, or ammonium polyphosphate). The polyurethane foams of Examples 8, 9, and 10 had a very high flame spread index value ($l_s$) during testing in accordance with ASTM D 3675. In addition, the polyurethane foam of Example 10 (which, as shown in Table 3, did not have expandable graphite as an ingredient in its formulation) rapidly ignited, exhibiting flaming running and flaming dripping during testing in accordance with ASTM D 3675 which ultimately consumed the test specimen within a very short period of time and the specific optical density of smoke value ($D_s$) during testing in accordance with ASTM E 662 was also very high. Additionally, in testing the polyurethane foam of Examples 8 and 9, fly ash formation was observed during testing and exhibited very high flame spread index values ($l_s$) during testing in accordance with ASTM D 3675. Accordingly, the polyurethane foams of Examples 8, 9, and 10, which all lacked at least one ingredient of the flame retardant agent, did not satisfy the FTA, FRA, and NFPA testing criteria.

Comparison of Resulting Polyurethane Foams Using Standard Vs. Microencapsulated Ammonium Polyphosphate (Example 11 vs. Example 5).

As shown in Table 3, Example 11 shows the flammability and physical characteristics of the resulting polyurethane foam prepared using standard ammonium polyphosphate (Exolit® AP 422 from Clariant Corporation) instead of microencapsulated ammonium polyphosphate (Exolit® AP 462 grade) which was used in Example 5.

As shown in Table 3, the resulting polyurethane foams of Example 5 and Example 11 exhibited almost identical flammability and physical characteristics for resulting polyurethane foams that were formed using Exolit® AP 422 (standard ammonium polyphosphate) and Exolit® AP 462 (microencapsulated ammonium polyphosphate).

Accordingly, regardless of whether the resulting polyurethane foam used standard ammonium polyphosphate or microencapsulated ammonium polyphosphate, the resulting polyurethane foam met the FTA, FRA, and NFPA testing criteria.

Effect of Different Grades of Expandable Graphite on Resulting Polyurethane Foams (Examples 12 and 13).

As shown in Table 3, Examples 12 and 13 illustrate use of different grades of expandable graphite with flake size of from about 44 microns (0.044 mm) to about 1000 microns (1.0 mm) in a resulting polyurethane foam. Expandable graphite used in Example 12 was the 3494 grade expandable graphite available from Asbury Graphite Mills, Inc. with particle size distribution from about 44 microns (about 0.044 mm) to about 300 microns (about 0.300 mm).

Expandable graphite used in Example 13, Grafguard® 160-80N, was a pH neutral grade of expandable graphite with typical mean particle size of about 250 microns (about 0.250 mm) available from Graftech International Holdings Inc. (formally Ucar Carbon Company).

Accordingly, only the resulting polyurethane foams as shown in Examples 5 and 11 through 13 satisfied the FTA, FRA, and NFPA testing criteria by meeting the requirements of the testing criteria. Additionally, when exposed to high energy flames, the resulting polyurethane foam of Examples 5 and 11 through 13 formed a significant char layer protecting the substrate underneath. Fly ash formation was not observed during ignition of the resulting polyurethane foam.

Example 14

As shown in Table 4, resulting polyurethane foam in the form of a molded foam was prepared with the ingredients in the amounts indicated in Example 14. The amount listed for each ingredient is parts by weight of the ingredient per 100 parts by weight of the polyoxyalkylene polyether polyol. Additionally, a preheated aluminum mold is used in the production of the molded foam. The aluminum mold has a dimension of about 10 inch×9 inch×4.75 inch. The aluminum mold is preheated heated to a temperature range from about 135° F. to about 145° F.

A mixture of polyoxyalkylene polyether polyol, catalysts, surface active agent, and water as the primary blowing agent as shown in the formulation given in Table 4 was weighed into a paper cup and mixed. Expandable graphite and ammonium polyphosphate was then gradually added with constant mixing followed by the addition of organophosphorus flame retardant. The required amount of organic polyisocyanate was calculated based on an isocyanate index of 80. The organic polyisocyanate was then weighed in a separate container and added to the mixture and then mixed for about 15 seconds.

The mixture was then poured into the preheated aluminum mold and cured for about 8 minutes at room temperature. The resulting foam was removed from the aluminum mold after about 8 minutes to obtain a resulting polyurethane foam that satisfied the FTA, FRA, and NFPA testing criteria by meeting the requirements of the testing criteria.

TABLE 4

The physical and flammability characteristics of the resulting flexible polyurethane foam in molded form.

| Example | 14 |
|---|---|
| Isocyanate Index | 80 |
| Polyoxyalkylene polyether polyol (b) | 100 |
| Primary blowing agent (q) | 4.50 |
| Surface active agent (I) | 1.00 |
| Crosslinker (k) | 1.00 |
| Amine catalyst (h) | 0.50 |
| Amine blow catalyst (j) | 0.10 |
| Organometallic tin catalyst (i) | 0.25 |
| Expandable Graphite (f) | 35 |
| Ammonium polyphosphate (g) | 18 |
| Organophosphorus Flame retardant (e) | 25 |
| Organic polyisocyanate (n) | 78 |
| Physical characteristics | |
| Molded density (pcf) (as per ASTM D 3574-Test A) | 4.43 |
| IFD at 25% at 4 inch (lbs) (as per ASTM D 3574-Test $B_1$) | 23.24 |
| Tensile strength (lb/sq. in) (as per ASTM D 3574-Test E) | 14.91 |
| Elongation (%) (as per ASTM D 3574Test E) | 61 |
| Resilience (%) (as per ASTM D 3574-Test H) | 42 |
| Compression Set (%) (as per ASTM D 3574-Test D, | 18.07 |

TABLE 4-continued

The physical and flammability characteristics of the resulting flexible polyurethane foam in molded form.

| Example | 14 |
|---|---|
| Isocyanate Index | 80 |
| 50% constant deflection) | |
| Flame Spread Index ($I_s$) (as per ASTM D 3675) | 6.89 |
| Specific optical density of smoke | |
| $D_s$ 1.5 min (Non-flaming mode) (as per ASTM E 662) | 73 |
| $D_s$ 4.0 min (Non-flaming mode) (as per ASTM E 662) | 124 |
| $D_{max}$ (corr) (Non-flaming mode) (as per ASTM E 662) | 147 |
| $D_s$ 1.5 min (Flaming mode) (as per ASTM E 662) | 76 |
| $D_s$ 4.0 min (Flaming mode) (as per ASTM E 662) | 156 |
| $D_{max}$ (corr) (Flaming mode) (as per ASTM E 662) | 189 |

Example 15—Prepolymer Method

As shown in Table 5 which references Example 15, a resulting polyurethane foam has been formed using a prepolymer method with the ingredients and amounts indicated. Reactive organophosphorus flame retardant is reacted with organic polyisocyanate and a portion of the organometallic tin catalyst from the foaming agent to form a prepolymer.

System polyol (which, as defined above, includes a polyoxyalkylene polyether polyol and a foaming agent), expandable graphite, and ammonium polyphosphate are then mixed together in the further presence of a remaining portion of the foaming agent to form a component. The prepolymer and the component are then reacted in the further presence of the remaining portion of the foaming agent to obtain a resulting polyurethane foam that satisfied the FTA, FRA, and NFPA testing criteria by meeting the requirements of the testing criteria. The ingredients, the respective amounts of the ingredients, and physical and flammability properties are shown in the Table 5. The amount listed for each ingredient is parts by weight of the ingredient per 100 parts by weight of the system polyol.

TABLE 5

Resulting Polyurethane Foam Formed Using Prepolymer Method.

| Example | 15 |
|---|---|
| Isocyanate Index | 80 |
| Prepolymer | |
| Organophosphorus flame retardant (e) | 25 |
| Organic polyisocyanate (n) | 76.8 |
| Organometallic tin catalyst (i) | 0.25 |
| Component | |
| System polyol (a) | 100 |
| Amine catalyst (h) | 0.25 |
| Organometallic tin catalyst (i) | 0.20 |
| Expandable graphite (f) | 35 |
| Ammonium polyphosphate (g) | 18 |
| Physical characteristics | |
| Molded density (pcf) (as per ASTM D 3574-Test A) | 4.05 |
| IFD at 25% at 4 inch (lbs) (as per ASTM D 3574-Test B) | 27.64 |
| Tensile strength (lb/sq. in) (as per ASTM D 3574-Test E) | 12.6 |
| Elongation (%) (as per ASTM D 3574-Test E) | 65.3 |
| Resilience (%) (as per ASTM D 3574-Test H) | 45 |
| Compression Set (%) (as per ASTM D 3574-Test D, 50% constant deflection) | 17.15 |
| Flame Spread Index ($I_s$) (as per ASTM D 3675) | 7.08 |
| Specific optical density of smoke | |
| $D_s$ 1.5 min (Non-flaming mode) | 73 |

TABLE 5-continued

Resulting Polyurethane Foam Formed Using Prepolymer Method.

| Example | 15 |
|---|---|
| Isocyanate Index | 80 |
| $D_s$ 4.0 min (Non-flaming mode) | 128 |
| $D_{max}$ (corr) (Non-flaming mode) | 157 |
| $D_s$ 1.5 min (Flaming mode) | 81 |
| $D_s$ 4.0 min (Flaming mode) | 150 |
| $D_{max}$ (corr) (Flaming mode) | 182 |

Example 16-19

In Table 6 which references Examples 16 through 19, a preparation of resulting polyurethane foam in a viscoelastic foam has been prepared with ingredients in the respective amounts indicated. The viscoelastic foam was prepared in a molded form and slabstock form. Examples 16 and 19 are related to slabstock foam and Examples 17 and 18 are related to molded foam. In examples 17 and 18 an aluminum mold of about 10 inch×9 inch×4.75 inch was used for the molded foam. The aluminum mold was preheated at a temperature within the range from about 135° F. to about 145° F. In examples 16 and 19, slabstock foams were prepared in a preheated cardboard box of about 16 inch×12 inch×12 inch. The cardboard box was preheated at a temperature of about 135° F.

Polyoxyalkylene polyether polyols, catalysts, surface active agent, and blowing agent were weighed into a paper cup and mixed. Expandable graphite and ammonium polyphosphate were then added to the mixture and mixed. Organophosphorus flame retardant was then added and mixed.

The amount of organic polyisocyanate was calculated based on the indicated isocyanate index in Table 6.

The organic polyisocyanate was added to the mixture and the mixture was mixed for about 20 seconds. The mixture was then poured into the preheated aluminum mold to make molded foams and poured into a preheated cardboard box to make slabstock foams, respectively, and the resulting polyurethane foam was removed from the aluminum mold and cardboard box, respectively, after about 10 minutes to obtain a resulting molded and slabstock polyurethane foam that satisfied the FTA, FRA, and NFPA testing criteria by meeting the requirements of the testing criteria.

The amount listed for each ingredient in Table 6 is parts by weight of the ingredient per 100 parts by weight of the polyoxyalkylene polyether polyol.

TABLE 6

Viscoelastic foam formulations and flammability and physical characteristics of the foam.

| Examples | 16 | 17 | 18 | 19 |
|---|---|---|---|---|
| Ingredients | | | | |
| Polyoxyalkylene Polyether polyol (c) | 97 | 97 | 97 | 97 |
| Polyoxyalkylene Polyether polyol (d) | 3 | 3 | 3 | 3 |
| Primary blowing agent (q) | 2.00 | 2.00 | 2.00 | 2.00 |
| Surface active agent (m) | 1.25 | 1.25 | 1.25 | 1.25 |
| Amine catalyst (h) | 0.90 | 1.50 | 1.50 | 1.50 |
| Amine catalyst (j) | 0.20 | 0.20 | 0.20 | 0.20 |
| Organometallic tin catalyst (i) | 0.30 | 0.30 | 0.30 | 0.30 |
| Expandable Graphite (f) | 35 | 27 | 27 | 27 |
| Ammonium polyphosphate (g) | 18 | 18 | 18 | 18 |
| Organophosphorus flame retardant (e) | 25 | 25 | 25 | 25 |
| Organic polyisocyanate (n) | 50.55 | 57.67 | — | — |
| Organic polyisocyanate (o) | — | — | 58.93 | 58.93 |
| Auxiliary blowing agent (r) | — | — | — | 5.00 |
| Physical Characteristics | | | | |
| Density (pcf) (as per ASTM D 3574-Test A) | 5.90 | 9.50 | 7.30 | 6.00 |
| IFD (lbs) at 25% at 3 inch (as per ASTM D 3574-Test $B_1$) | — | — | — | 5.44 |
| Tensile strength (lb/sq. in) (as per ASTM D3574-Test E) | — | 6.34 | 5.84 | 14.2 |
| Elongation (%) (as per ASTM D 3574-Test E) | — | 85.3 | 61.3 | 56.0 |
| Resilience (at 3") (%) (as per ASTM D 3574-Test H) | — | 7 | 10 | 11 |
| Compression Set (%) (as per ASTM D 3574-Test D, 50% constant deflection) | — | — | — | — |
| Flame Spread Index ($I_s$) (as per ASTM D 3675) | 18.26 | 15.46 | 10.95 | 4.80 |
| Specific optical density of smoke | | | | |
| $D_s$ 1.5 min (Non-flaming mode) (as per ASTM E 662) | 72 | 64 | 64 | 72 |
| $D_s$ 4.0 min (Non-flaming mode) (as per ASTM E 662) | 129 | 118 | 123 | 142 |
| $D_{max}$ (corr) (Non-flaming mode) (as per ASTM E 662) | 142 | 153 | 164 | 184 |
| $D_s$ 1.5 min (Flaming mode) (as per ASTM E 662) | 62 | 58 | 69 | 75 |
| $D_s$ 4.0 min (Flaming mode) (as per ASTM E 662) | 138 | 142 | 168 | 157 |
| $D_{max}$ (corr) (flaming mode) (as per ASTM E 662) | 171 | 200 | 215 | 219 |

Example 20

The fire retardancy of the resulting polyurethane foam of Example 5 was tested with an Oxygen Consumption calorimeter in accordance with ASTM E 1354 and the results are shown in Table 7. As shown in Table 7, the resulting polyurethane foam of Example 5 had a peak heat release rate of less than 100 kW/m2. The resulting polyurethane foam has a relatively low peak heat release rate.

TABLE 7

Peak Heat Release Rate for Example 5 foam using Oxygen Consumption Calorimeter During Testing in Accordance with ASTM E 1354.

| Foam From Example | 5 |
|---|---|
| Isocyanate Index | 80 |
| Specimen size 4 in × 4 in | 4 in × 4 in |
| Specimen thickness | 2 in |
| Specimen initial mass (prior to testing) | 34.5 g |
| Heat flux | 50 kW/m$^2$ |
| Orientation | Horizontal |
| Peak heat release rate | 88.8 kW/m$^2$ |

Example 21

Resulting polyurethane foam test specimens were formulated in accordance with Example 6. For comparison purposes, certain resulting polyurethane foam test specimens were not water leached and other resulting polyurethane foam test specimens were water leached in accordance with Federal Standard 191A, Method 5830, Entitled "Leaching Resistance of Cloth; Standard Method" (Jul. 20, 1978).

Certain resulting polyurethane foam test specimens were not water leached for comparison purposes. Prior to the flame spread testing (as per ASTM D 3675) and smoke density testing (as per ASTM E 662), the resulting polyurethane foam test specimens were weighed and the average mass was derived as shown in Table 8 under the "before leaching" column. Then, the resulting polyurethane foam test specimens were flame spread tested for flame spread index ($I_s$) as per ASTM D 3675 and smoke density tested for smoke density values ($D_s$ and $D_{max}$ (con)) as per ASTM E 662. Results are shown in the "before leaching" column in Table 8.

For the resulting polyurethane foam test specimens that were selected for water leaching, the resulting polyurethane foam test specimens were soaked continuously for 24 hours in water that was changed every 15 minutes. After the passage of the 24-hour period, the resulting polyurethane foam test specimens were dried to a constant mass. The resulting polyurethane foam test specimens were weighed and the average mass was derived as shown in Table 8 in the "after leaching" column.

As shown in Table 8, the difference between the average mass of the resulting polyurethane foam test specimens before leaching and after leaching was insignificant (118.0 grams vs. 117.3 grams, respectively). This result indicated that the flame retardant agent was not leached out from the resulting polyurethane foam. In other words, the flame retardant agent was still bound to the polyurethane matrix of the resulting polyurethane foam.

After the passage of the 24-hour period for conditioning the resulting polyurethane foam test specimens, the resulting polyurethane foam test specimens were flame spread tested for flame spread index ($I_s$) as per ASTM D 3675 and smoke density tested for smoke density values ($D_s$ and $D_{max}$ (corr)) as per ASTM E 662. The results are shown in Table 8 in the "after leaching" column.

The test results for average mass, flame spread index, and smoke density values as shown in Table 8 indicate that the flame retardant agent is bound to the polyurethane matrix of the resulting polyurethane foam even after water leaching and that the surface flammability and specific optical density characteristics of the resulting polyurethane foam are permanent and that they satisfied the FTA, FRA, and NFPA testing criteria by meeting the requirements of the testing criteria even after water leaching.

TABLE 8

Specific Optical Density and Flame Spread Index Values of Resulting Polyurethane Foam Specimen During Testing in Accordance with Federal Standard 191 A, Method 5830.

| Foam From Example | 6 | 6 |
|---|---|---|
| Isocyanate Index | 90 | 90 |
| Leaching | Before Leaching | After Leaching |
| Specimen size | 18 in × 6 in × 1 in | 18 in × 6 in × 1 in |
| Average specimen mass | 118.0 g | 117.3 g |
| Flame Spread Index ($I_s$) (as per ASTM D 7.78 3675) | 7.78 | 6.80 |
| Specific optical density of smoke | | |
| $D_s$ 1.5 min (Non-flaming mode) (as per ASTM E 662) | 84 | 69 |
| $D_s$ 4.0 min (Non-flaming mode) (as per ASTM E 662) | 146 | 124 |
| $D_{max}$ (corr) (Non-flaming mode) (as per ASTM E 662) | 163 | 142 |

TABLE 8-continued

Specific Optical Density and Flame Spread Index Values of Resulting Polyurethane Foam Specimen During Testing in Accordance with Federal Standard 191 A, Method 5830.

| Foam From Example | 6 | 6 |
|---|---|---|
| Isocyanate Index | 90 | 90 |
| $D_s$ 1.5 min (Flaming mode) (as per ASTM E 662) | 67 | 57 |
| $D_s$ 4.0 min (Flaming mode) (as per ASTM E 662) | 156 | 127 |
| $D_{max}$ (corr) (Flaming mode) (as per ASTM E 662) | 185 | 159 |

What is claimed is:

1. A resulting polyurethane foam produced by a flame retardant process comprising reacting:
    (a) at least one polyoxyalkylene polyether polyol,
    (b) at least one organic polyisocyanate, and
    (c) at least one foaming agent comprising:
        (i) at least one blowing agent, wherein said blowing agent comprises a primary blowing agent,
        (ii) at least one surface active agent, and
        (iii) at least one catalyst,
    and in the further presence of:
    (d) at least one flame retardant agent comprising:
        (i) expandable graphite,
        (ii) at least one ammonium polyphosphate, and
        (iii) at least one organophosphorus flame retardant,
    wherein said resulting polyurethane foam is used for cushioning application materials and wherein the surface flammability of said resulting polyurethane foam does not exhibit any flaming running or flaming dripping, wherein flame spread index of said resulting polyurethane foam is less than or equal to 25 during testing of said resulting polyurethane foam in accordance with ASTM D 3675, wherein specific optical density of smoke value of said resulting polyurethane foam is less than or equal to 100 under flaming mode and non-flaming mode at 1.5 minutes during testing of said resulting polyurethane foam in accordance with ASTM E 662, and wherein specific optical density of smoke value of said resulting polyurethane foam is less than or equal to 175 under flaming mode and non-flaming mode at 4.0 minutes during testing of said resulting polyurethane foam in accordance with ASTM E 662, in satisfaction of fire performance criteria of the Federal Railroad Administration, Federal Transit Administration, and National Fire Protection Association.

2. The resulting polyurethane foam of claim 1 wherein said expandable graphite has a flake size of from about 0.044 mm to about 2.0 mm.

3. The resulting polyurethane foam of claim 1 wherein said expandable graphite is used in an amount of from about 20 parts by weight to about 40 parts by weight per 100 parts by weight of said polyoxyalkylene polyether polyol.

4. The resulting polyurethane foam of claim 1 wherein said ammonium polyphosphate is used in an amount of from about 10 parts by weight to about 30 parts by weight per 100 parts by weight of said polyoxyalkylene polyether polyol.

5. The resulting polyurethane foam of claim 1 wherein said organophosphorus flame retardant is used in an amount of from about 20 parts by weight to about 40 parts by weight per 100 parts by weight of a polyoxyalkylene polyether polyol.

6. The resulting polyurethane foam of claim 1 wherein said polyoxyalkylene polyether polyol has a molecular weight of from about 1000 to about 8000.

7. The resulting polyurethane foam of claim 1 wherein the amount of said organic polyisocyanate is calculated using an isocyanate index of from about 70 to about 130.

8. The resulting polyurethane foam of claim 1 wherein said resulting polyurethane foam has a density ranging from about 2 to about 30 pounds per cubic feet.

9. The resulting polyurethane foam of claim 1 wherein said resulting polyurethane foam is molded or slabstock.

10. The resulting polyurethane foam of claim 9 wherein said resulting polyurethane foam is viscoelastic.

11. The resulting polyurethane foam of claim 1 wherein said ammonium polyphosphate is standard or microencapsulated.

12. The resulting polyurethane foam of claim 1 wherein said catalyst of said foaming agent is an organometallic tin catalyst, an amine catalyst, or a combination thereof.

13. The resulting polyurethane foam of claim 1 wherein said resulting polyurethane foam is water leached in accordance with Federal Standard 191A, Method Number 5830.

14. The resulting polyurethane foam of claim 1 wherein said polyoxy 1 alkylene polyether polyol is a system polyol.

15. The resulting polyurethane foam of claim 1 wherein said foaming agent further comprises an auxiliary blowing agent.

16. The resulting polyurethane foam of claim 1 wherein said foaming agent further comprises a crosslinker.

17. The resulting polyurethane foam of claim 1 wherein said flame retardant process does not include an anti-settling agent.

\* \* \* \* \*